(12) United States Patent
Itoh

(10) Patent No.: US 11,305,940 B2
(45) Date of Patent: Apr. 19, 2022

(54) HOLDER TRANSPORT APPARATUS

(71) Applicant: AOI SEIKI CO., LTD., Kumamoto (JP)

(72) Inventor: Teruaki Itoh, Kumamoto (JP)

(73) Assignee: AOI SEIKI CO., LTD., Kumamoto (JP)

( * ) Notice: Subject to any disclaimer, the term of this patent is extended or adjusted under 35 U.S.C. 154(b) by 0 days.

(21) Appl. No.: 17/301,221

(22) Filed: Mar. 29, 2021

(65) Prior Publication Data
US 2021/0214166 A1    Jul. 15, 2021

Related U.S. Application Data

(62) Division of application No. 16/392,954, filed on Apr. 24, 2019, now Pat. No. 10,988,316.

(30) Foreign Application Priority Data

Apr. 25, 2018  (JP) .............................. JP2018-084068
Apr. 18, 2019  (JP) .............................. JP2019-079384

(51) Int. Cl.
*B65G 1/127*    (2006.01)
*B65G 17/12*    (2006.01)
*G01N 35/04*    (2006.01)

(52) U.S. Cl.
CPC ............. *B65G 17/12* (2013.01); *G01N 35/04* (2013.01); *B65G 2201/0235* (2013.01); *G01N 2035/0406* (2013.01); *G01N 2035/0465* (2013.01)

(58) Field of Classification Search
CPC ........ B65G 1/127; B65G 1/133; B65G 17/12; B65G 47/57; B65G 2201/0235; G01N 35/04; G01N 2035/0406; G01N 2035/0465
USPC .................................. 198/347.1, 347.4, 435
See application file for complete search history.

(56) References Cited

U.S. PATENT DOCUMENTS

| 3,184,032 | A | 5/1965 | Jonsson |
| 3,796,544 | A | 3/1974 | Zauft et al. |
| 4,643,495 | A | 2/1987 | Pepping et al. |
| 4,964,498 | A | 10/1990 | Klingl |
| 5,224,585 | A | 7/1993 | Blanco et al. |
| 5,350,050 | A | 9/1994 | Franke |
| 5,351,801 | A | 10/1994 | Markin et al. |

(Continued)

FOREIGN PATENT DOCUMENTS

| AU | 2009280092 | 2/2010 |
| CN | 101238021 | 8/2008 |

(Continued)

OTHER PUBLICATIONS

Office Action issued in CA Appln. No. 3,040,954 dated Jun. 2, 2020.
(Continued)

*Primary Examiner* — Joseph A Dillon, Jr.
(74) *Attorney, Agent, or Firm* — Nixon & Vanderhye P.C.

(57) ABSTRACT

A holder transport apparatus according to an embodiment includes, an elevator device comprising a conveyance member which includes an ascending path and a descending path arranged along an ascending and descending circulation path that circulates, and a plurality of support plates which are attached to the conveyance member and support a holder which holds a sample container in an erect state.

12 Claims, 14 Drawing Sheets

(56) References Cited

U.S. PATENT DOCUMENTS

| | | | |
|---|---|---|---|
| 5,634,760 | A | 6/1997 | Anderson et al. |
| 5,860,784 | A | 1/1999 | Schuitema et al. |
| 6,156,565 | A * | 12/2000 | Maes ............... G01N 35/00029 |
| | | | 435/287.3 |
| 6,945,380 | B2 | 9/2005 | Sauer |
| 7,195,737 | B2 * | 3/2007 | Itoh ....................... B04B 5/0421 |
| | | | 422/65 |
| 7,210,889 | B2 | 5/2007 | McFarland |
| 8,037,994 | B2 | 10/2011 | Schaefer |
| 8,590,690 | B2 * | 11/2013 | Benz .................. B65G 47/5104 |
| | | | 198/347.4 |
| 8,678,738 | B2 | 3/2014 | Pedrazzini |
| 8,894,929 | B2 * | 11/2014 | Itoh ....................... G01N 35/04 |
| | | | 422/65 |
| 8,905,221 | B2 | 12/2014 | Young |
| 9,199,791 | B2 | 12/2015 | Pietsch |
| 9,810,706 | B2 | 11/2017 | Ether et al. |
| 9,957,111 | B2 * | 5/2018 | Cherubini .............. B65G 33/04 |
| 10,001,498 | B2 | 6/2018 | Takai et al. |
| 10,155,631 | B2 | 12/2018 | Pedrazzini |
| 10,175,259 | B2 | 1/2019 | Riether |
| 10,499,658 | B2 | 12/2019 | Weiss |
| 11,112,419 | B2 * | 9/2021 | van Mierlo .......... B65G 17/005 |
| 2004/0035678 | A1 | 2/2004 | Biondi et al. |
| 2004/0089737 | A1 | 5/2004 | Itoh |
| 2004/0149541 | A1 | 8/2004 | Sauer |
| 2004/0235397 | A1 | 11/2004 | Lack |
| 2004/0238326 | A1 | 12/2004 | Lichti |
| 2008/0160599 | A1 | 7/2008 | Weber-Matthiesen et al. |
| 2008/0271546 | A1 | 11/2008 | Miller et al. |
| 2009/0090598 | A1 | 4/2009 | Nakamura et al. |
| 2009/0107803 | A1 | 4/2009 | Ellerth et al. |
| 2009/0260457 | A1 | 10/2009 | Itoh |
| 2010/0114362 | A1 | 5/2010 | Zumbrunn et al. |
| 2013/0011227 | A1 | 1/2013 | Pietsch |
| 2013/0175342 | A1 | 7/2013 | Itoh |
| 2014/0061001 | A1 | 3/2014 | Studer |
| 2014/0079527 | A1 | 3/2014 | Takai et al. |
| 2015/0147819 | A1 | 5/2015 | Pedrazzini |
| 2015/0158677 | A1 | 6/2015 | Philipp et al. |
| 2015/0226760 | A1 | 8/2015 | Itoh |
| 2016/0251170 | A1 | 9/2016 | Pedrazzini |
| 2016/0327583 | A1 | 11/2016 | Pollack |
| 2018/0105370 | A1 | 4/2018 | Philipp |
| 2018/0235240 | A1 | 8/2018 | Weiss |
| 2018/0273306 | A1 | 9/2018 | Sullivan et al. |
| 2019/0004077 | A1 | 1/2019 | van Mierlo et al. |
| 2019/0008164 | A1 | 1/2019 | Weiss |
| 2019/0009995 | A1 | 1/2019 | Philipp |
| 2019/0062052 | A1 | 2/2019 | Sands et al. |
| 2019/0072462 | A1 | 3/2019 | Pedrazzini |
| 2019/0382209 | A1 | 12/2019 | Sergent et al. |
| 2020/0047999 | A1 | 2/2020 | O'Connell |
| 2020/0115160 | A1 | 4/2020 | Maeda |
| 2020/0270060 | A1 | 8/2020 | Almogy et al. |

FOREIGN PATENT DOCUMENTS

| | | |
|---|---|---|
| CN | 102785792 | 11/2012 |
| CN | 102887343 | 1/2013 |
| CN | 203319139 | 12/2013 |
| CN | 104828459 | 8/2015 |
| CN | 105683065 | 6/2016 |
| CN | 105891699 | 8/2016 |
| CN | 105917352 | 8/2016 |
| CN | 1073 52252 | 11/2017 |
| CN | 206886002 | 1/2018 |
| CN | 207137965 | 3/2018 |
| EP | 0 847 943 | 6/1998 |
| EP | 3 196 652 A1 | 7/2017 |
| JP | 2004-212064 | 7/2004 |
| JP | 2010-526289 | 7/2010 |
| KR | 10-1634490 | 6/2016 |
| WO | WO 02/098770 | 12/2002 |
| WO | WO 2010/016860 | 2/2010 |
| WO | WO 2014/191162 | 12/2014 |
| WO | WO 2015/059620 | 4/2015 |

OTHER PUBLICATIONS

Office Action issued in CN Appln. No. 201910336353,1 dated Jul. 3, 2020 (w/ translation).
Office Action issued in CN Appln. No. 201910336353,1 (dated Feb. 25, 2021) (w/ translation).
Office Action issued in KR Appln. No. 10-2019-0048720 dated Aug. 27, 2020 (w/ translation).
Office Action issued in TW Appln. No. 108114417 dated Oct. 29, 2019 (w/ translation).
Search Report issued in EP Appln. No. 19170624.1 dated Sep. 25, 2019.
Delivery practice, Liang army etc., pp. 92 and 93, China Fortune Publishing (Oct. 31, 2015).
Office Action dated Aug. 17, 2021 issued in Chinese Application No. 201910336353.1 with English translation (15 pages).
Extended European Search Report dated Jul. 30, 2021 issued in European Application No. 21168184.6 (9 pages).

* cited by examiner

HOLDER TRANSPORT APPARATUS

CROSS-REFERENCE TO RELATED APPLICATIONS

This application is a divisional of Ser. No. 16/392,954 dated Apr. 24, 2019, which claims the benefit of Japanese Patent Application No. 2018-084068, filed Apr. 25, 2018 and No. 2019-79384, filed Apr. 18, 2019, the entire contents of which are incorporated herein by reference.

BACKGROUND

1. Field

The present invention relates to a holder transport apparatus which causes a sample holder for holding a sample container to ascend and descend.

2. Description of the Related Art

In a transport apparatus which conveys a sample container capable of housing a sample such as blood, a holder transport apparatus which conveys a holder for holding the sample container in an erect state is already known in the art (e.g., Jpn. Pat. Appln. KOKAI Publication No. 2004-212064).

The holder transport apparatus includes, for example, a pair of guide rails provided along a predetermined transport path, and a belt conveyor provided between the pair of guide rails and moved in a predetermined direction. For example, if a plurality of transport lines are provided, the transport lines are arranged on a horizontal plane.

In the above-described holder transport apparatus, an installation space for the number of transport lines is required. Thus, a large space needs to be secured according to the number of transport lines.

SUMMARY

A holder transport apparatus according to an embodiment includes, an elevator device comprising a conveyance member which includes an ascending path and a descending path arranged along an ascending and descending circulation path that circulates, and a plurality of support plates which are attached to the conveyance member and support a holder which holds a sample container in an erect state.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

First Embodiment

Figure 1:
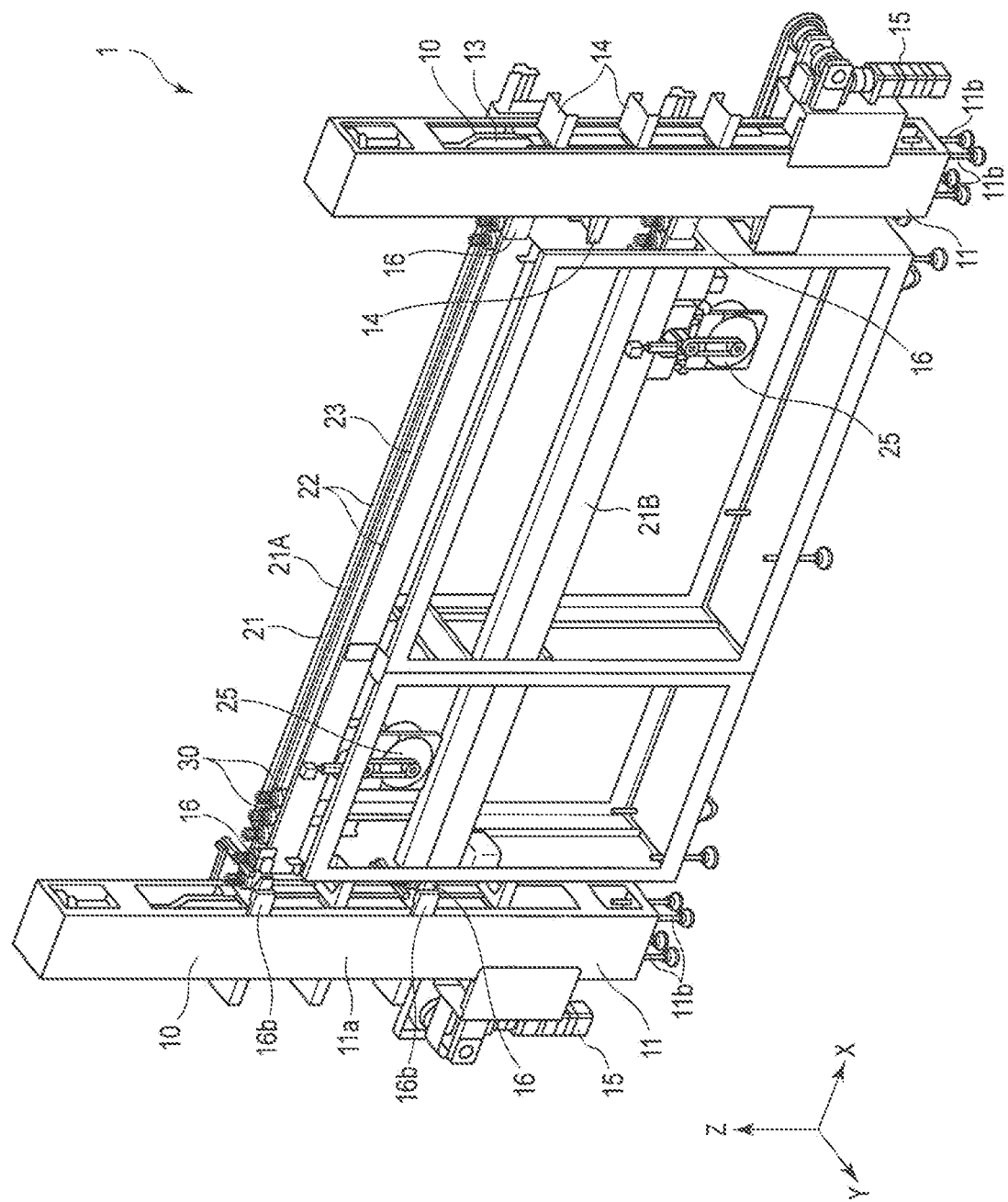
FIG. 1 is a perspective view of a holder transport apparatus according to a first embodiment of the present invention.
Figure 2:
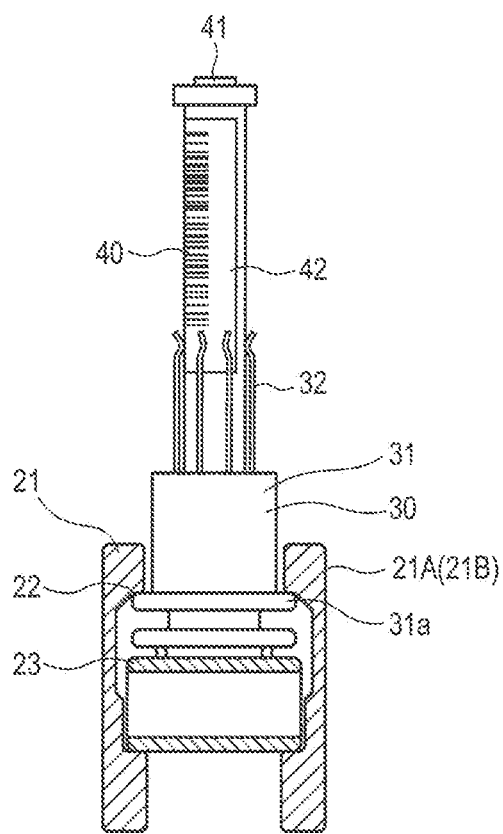
FIG. 2 is a cross-sectional view of a transport line of the holder transport apparatus according to the embodiment.
Figure 3:
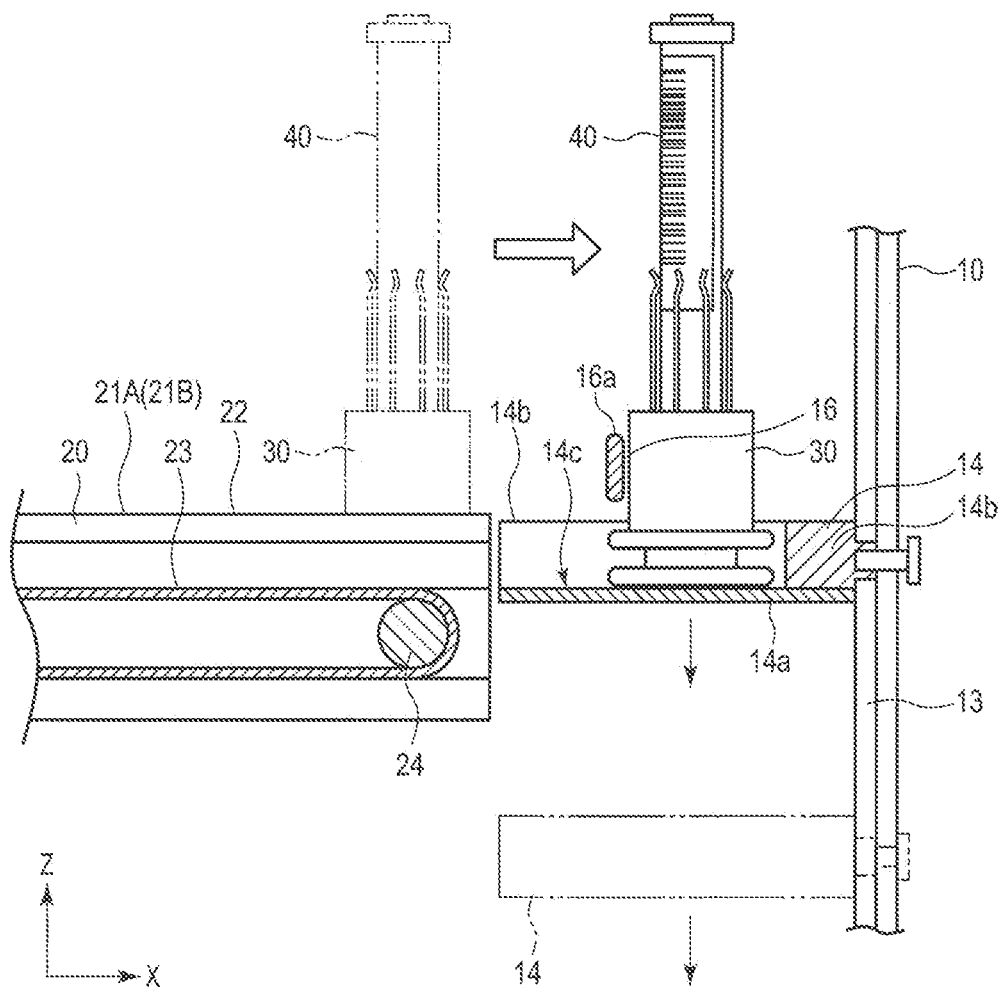
FIG. 3 is a cross-sectional view showing part of the holder transport apparatus according to the embodiment.
Figure 4:
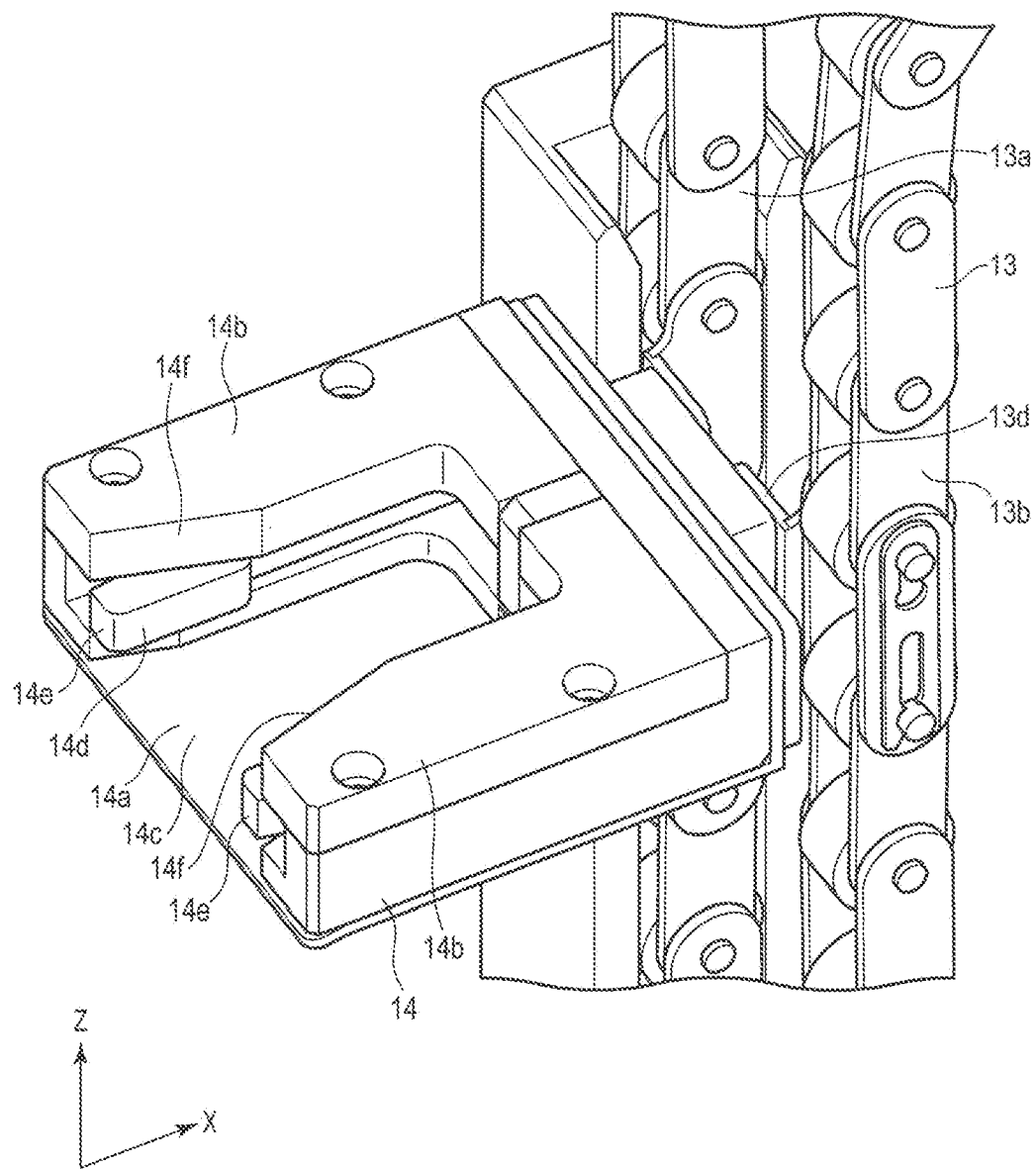
FIG. 4 is a perspective view showing part of the holder transport apparatus according to the embodiment.
Figure 5:
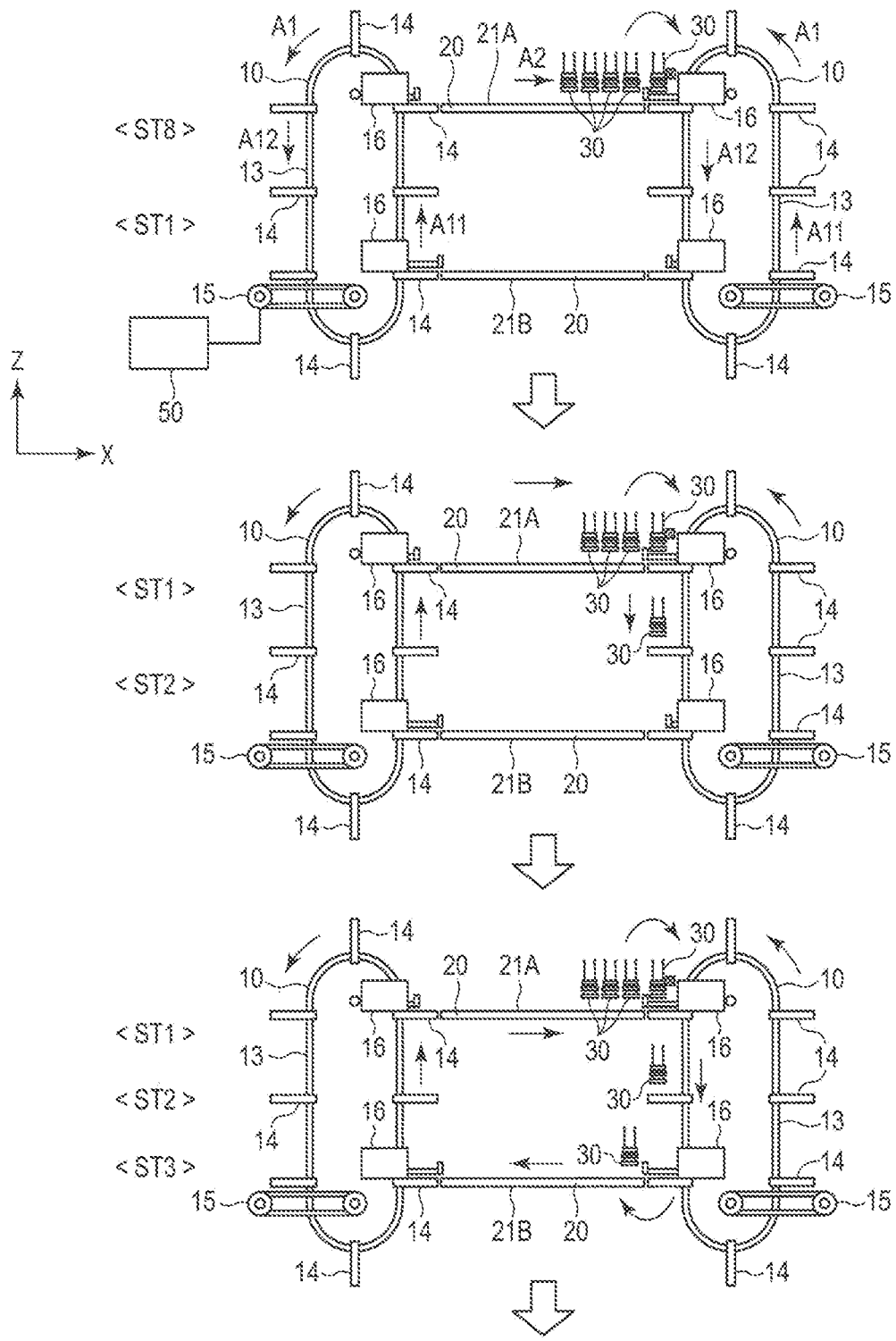
FIG. 5 is an explanatory diagram illustrating an operation of the holder transport apparatus according to the embodiment.
Figure 6:
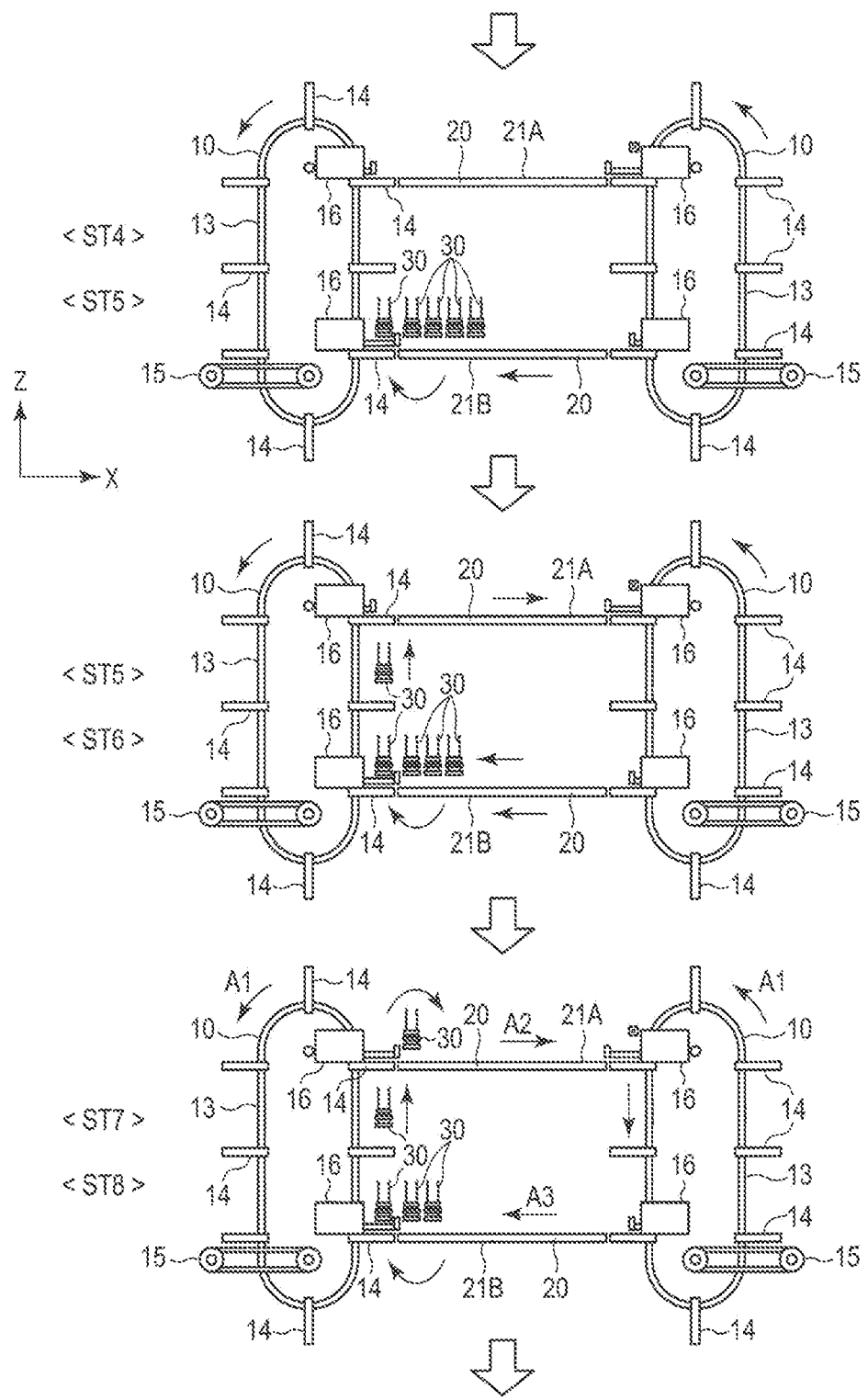
FIG. 6 is an explanatory diagram illustrating an operation of the holder transport apparatus according to the embodiment.

A holder transport apparatus 1 and a holder transporting method according to an embodiment of the present invention will be described with reference to FIGS. 1 to 5. FIG. 1 is a perspective view of the holder transport apparatus 1 according to a first embodiment. FIG. 2 is a cross-sectional view showing a configuration of a conveyor line of the holder transport apparatus 1, and FIG. 3 is a cross-sectional view showing part of the holder transport apparatus 1. FIG. 4 is a perspective view showing part of the holder transport apparatus 1, and FIGS. 5 and 6 are explanatory diagrams illustrating operations of the holder transport apparatus 1. In the drawings, arrows X, Y, and Z indicate three directions which are perpendicular to each other.

The holder transport apparatus 1 comprises a pair of elevator devices 10, a conveyor device 20 provided between the paired elevator devices 10, and a controller 50.

The paired elevator devices 10 on both sides face each other, with the conveyor device 20 interposed, and are arranged with a predetermined space therebetween. The paired elevator devices 10 comprise a housing 11 constituting an outer surface; an ascending and descending mechanism including a plurality of conveyor rollers provided along a predetermined ascending and descending circulation path A1 (an ascending and descending path), an ascending and descending chain 13 as a conveyance member which runs across the transport rollers, a plurality of support plates 14 (support portion) arranged on the ascending and descending chain 13, and an ascending and descending driving device 15 rotating a belt conveyor roller 24; and a moving device 16 moving the holder 30 between the moving device 16 and the conveyor device 20. The paired elevator devices 10 are configured in the same manner, except that the support plates 14 of one elevator device 10 are set in a reverse direction to those of the other elevator device 10.

The housing 11 comprises, for example, a frame 11a configured in a rectangular-parallelepiped shape elongated in a Z direction that is a vertical direction, and four leg portions 1ib formed on a bottom portion of the frame 11a. The frame 11a includes openings on both surfaces, a surface facing the conveyor device 20 and a surface on the opposite side thereof. The support plates 14 protrude from these openings.

The ascending and descending driving device 15 moves the ascending and descending chain 13, that runs across the outside of the conveyor rollers, in a predetermined direction by rotating the conveyor rollers.

The ascending and descending circulation path A1 includes an ascending path A11 and a descending path A12 extending vertically, the ascending path A11 and the descending path A12 being connected at top and bottom end portions thereof, and thus is configured to be in a vertically long loop shape.

The ascending and descending chain 13 comprises a pair of chain belts 13a and 13b, the paired chain belts 13a and 13b running along the ascending and descending circulation path A1, and is configured to be in a loop shape. For example, each of the chain belts 13a and 13b is a belt having a chain structure which sees a plurality of link plates coupled in the direction of transportation. The ascending and descending chain 13 is provided with a plurality of support plates 14 at a predetermined interval.

Each of the support plates 14 is fixed to the ascending and descending chain 13 by a bracket 13d. The support plates 14 are provided to stand on an outer circumference side of the loop of the ascending and descending chain 13, and are also supported. The support plate 14 comprises a plate member 14a including a mounting surface 14c orthogonal to the circulation path, a guide wall 14b (guide member) provided to stand on an outer circumference of a surface that is a main surface of one side of the plate member 14a, and a holding portion 14d including a pair of claw pieces 14e that protrude inward from the guide wall 14b.

The guide wall 14b is formed to a U-shape in plane view which opens to the conveyor line side, and includes an inner wall 14f inclined and tapered so that the opening side has a larger space. One of the surfaces of the plate member 14a includes a support surface orthogonal to the path of the ascending and descending circulation path A1.

When the holder 30 is mounted on the mounting surface 14c, which is a main surface of one side of the plate member 14a, the support plate 14 supports the holder 30 in an erect state courtesy of the guide wall 14b and the holding portion 14d. The plurality of support plates 14 are attached in a direction in which the mounting surface 14c on the front side faces upward in the transport path on the conveyor device 20 side.

The holding portion 14d includes a pair of claw pieces 14e, 14e protruding inward from the inner wall 14f of the guide wall 14b, and is elastically deformable so that a space between the paired claw pieces 14e, 14e expands and contracts.

In the present embodiment, the elevator device 10 on one side is a descending device, including the descending path A12 arranged on the conveyor device 20 side and the ascending path A11 arranged on the opposite side of the conveyor device 20. This elevator device 10 causes the holder 30 received from the conveyor device 20 to descend. The elevator device 10 on the other side is an ascending device, including the ascending path A11 arranged on the conveyor device 20 side and the descending path A12 arranged on the opposite side of the conveyor device 20. This elevator device 10 causes the holder 30 received from the conveyor device 20 to ascend.

In each elevator device 10, the moving device 16 is provided at two positions in a vertical direction where the conveyor line faces. The moving device 16 comprises a holder arm 16a that moves the holder 30 on the support plate 14 and the conveyor line therebetween, and an arm-driving device 16b that causes a moving arm to operate at a predetermined timing. The moving device 16 rotates or moves the holder arm 16a so as to causes the holder 30 arranged on the conveyor belt 23 to move on the support plate 14, or causes the holder 30 on the support plate 14 to move onto the conveyor belt 23.

On the other hand, for example, the upper moving device 16 of the elevator device 10, on the right side of the drawing, moves the holder arm 16a at a predetermined timing according to control of a controller 50, so as to repeat an operation of causing the holder 30 to slide, and moves a plurality of holders 30 sequentially from the conveyor belt 23 onto the support plates 14. The lower moving device 16 of the elevator device 10 on this one side, for example, repeats an operation of causing the holder 30 to slide at a predetermined timing according to the control of the controler 50, and moves a plurality of holders 30 sequentially from the support plates 14 onto the conveyor belt 23.

On the other hand, the upper moving device 16 of the elevator device 10 on the left side of the drawing, for example, repeats an operation of moving the holder arm 16a at a predetermined timing according to the control of the controler 50 to cause the holder 30 to slide, and moves a plurality of holders 30 sequentially from the support plates 14 onto the conveyor belt 23. The lower moving device 16 of the elevator device 10 on this other side, for example, repeats an operation of causing the holder 30 to slide at a predetermined timing according to the control of the controler 50, and moves a plurality of holders 30 sequentially from the conveyor belt 23 onto the support plates 14.

The conveyor device 20 comprises a plurality of stages of transport lines 21A and 21B arranged vertically. The transport lines 21A and 21B convey the holders 30 for holding the sample containers 40 in an erect state along a predetermined transport path. For example, in the present embodiment, the conveyor device 20 includes the vertically two-staged transport lines 21A and 21B.

Each transport line 21A is configured by comprising a pair of guide rails 22 along a transport path extending horizontally in an X direction, the loop-shaped conveyor belt 23 between the paired guide rails 22, a plurality of belt conveyor rollers 24 on the rear side of the conveyor belt 23, and a transport driving device 25 that moves the conveyor belt 23 by rotationally driving at least part of a plurality of belt conveyor rollers 24.

A plurality of belt conveyor rollers 24 comprise a drive roller and a support roller including axes along a Y direction and arranged along a predetermined transport path. The drive roller is connected to the ascending and descending driving device 15, and moves the conveyor belt 23 that runs across the outside of a plurality of belt conveyor rollers through the act of the drive roller being rotationally driven by the transport driving device 25.

The vertically paired transport lines 21A and 21B are arranged along the X direction. The lower transport line 21B includes a transport path from one side toward the other, and the upper transport line 21A includes a transport path in the opposite direction of the transport path of the lower transport line 21B.

The holder 30 comprises a holding cylindrical portion 31 that is cylindrical and has a bottom, and a plurality of holding pins 32 extending upward of the holding cylindrical portion 31. The holding cylindrical portion 31 includes an annular step 31a on an outer circumferential surface. This step 31a is engaged with an inner wall of the guide rail 22 so that the holder 30 is guided to the guide rail 22. The holding pin 32 is, for example, a metal pin member, and is bent so that a part thereof protrudes inwardly in the radial direction of the holder 30. The holding pin 32 is elastically deformable. The holder 30 holds the sample container 40 through the act of bent portions of a plurality of holding pins 32 pressing the outer circumferential surface of the sample container 40 inserted into the holding cylindrical portion 31. The holder 30, holding the sample container 40, is engaged between the paired guide rails 22 to be supported in an erect state, and is conveyed together with the movement of the conveyor belt 23.

As shown in FIGS. 2 and 3, the sample container 40 is, for example, a tubular blood-collecting tube made of transparent glass, etc. The sample container 40 forms a cylindrical shape having a columnar space in which blood serum can be contained as a sample, and has an open top. The open top is provided with a cap 41. On the outer circumferential side surface of the sample container 40, for example, a label 42 is adhesively pasted. A bar code as an information display portion indicating various kinds of information, such as identification information of the sample, is displayed on the label 42.

The controler 50 comprises a processor that controls an operation of each portion based on various data and arithmetic operation and determination results. Specifically, the controller 50 causes a transport mechanism to operate at a predetermined timing to perform conveyance.

Next, a holder-transporting method by using the holder transport apparatus 1 according to the present embodiment will be explained with reference to FIGS. 5 and 6. Herein, as an example, a procedure of causing the holder 30 on the upper transport line 21A to descend by the elevator device 10, thereby move to the lower transport line 21B, and causing the holder 30 to ascend by the other elevator device 10, will be described by way of example, but the procedure is not limited thereto.

The holder-transporting method according to the present embodiment comprises a first moving step (ST1) of moving the holder 30 onto the support plate 14 of the descending line from the upper conveyor line courtesy of the moving device 16, a descending step (ST2) causing the holder 30 to descend by the descending line, a second moving step (ST3) moving the holder 30 from the support plate 14 of the descending line to the lower conveyor line courtesy of the moving device 16, a lower transport step (ST4) conveying the holder 30 toward the ascending line by the lower conveyor line, a third moving step (ST5) moving the holder 30 from the lower conveyor line to the support plate 14 of the ascending line by the moving device 16, an ascending step (ST6) causing the holder 30 to ascend by the ascending line, a fourth moving step (ST7) of moving the holder 30 from the support plate 14 of the ascending line to the upper conveyor line, and an upper transport step (ST8) conveying the holder 30 toward the descending line by the upper conveyor line.

As shown in FIGS. 3 and 5, as moving steps (ST1, ST3, ST5, and ST7) between the conveyor line and the support plate 14, the controller 50 drives the moving arm to enter a position where the holder 30 stands by from a retreat position of the moving arm, and further moves the moving arm in the X direction so as to extrude or draw in the holder 30 to a predetermined target position. At this time, a surface facing the conveyor line and a top surface of the support plate 14 are opened, the holder 30 moves to a predetermined position on the mounting surface 14c through this opening. At this time, an outer circumference of the holder 30 is held between the guide wall 14b and the paired claw pieces 14e of the elastically deformable holding portion 14d.

For the upper transport step (ST8) and the lower transport step (ST4), the controller 50 moves the conveyor belt 23 by rotating the ascending and descending driving device 15 to move the holder 30 in the transport direction.

For the descending step (ST2) and the ascending step (ST6), the controller 50 moves the ascending and descending chain 13 by driving the drive roller of the elevator device 10. At this time, the support plates 14 of the descending line and the ascending line descend or ascend in a state in which the top surfaces of the support plates 14 face upward. On the other hand, on the sides opposite to the descending line and the ascending line of the circulation ascending and descending path (i.e., on sides apart from the conveyor line), the support plates 14 ascend or descend in a state in which the rear surfaces of the support plates 14 face upward.

In the holder transport apparatus 1 configured as described above, with the elevator device 10 that causes the holder 30 to ascend and descend in an erect state, a plurality of transport lines 21A and 21B can be arranged vertically, which reduces the space. Namely, since the vertical space can be utilized more effectively than in the instance where an outward path and a return path are disposed side by side, the installation space can be reduced. In addition, in each elevator device 10, the holders 30 can be ascended and descended sequentially by a simple configuration which only provides the support plates 14 orthogonal to the loop-shaped ascending and descending chain 13. Furthermore, the support plate 14 includes the guide wall 14b, one side of which opens tapered, and simply by sliding the holder 30 to be mounted on the support plate 14, the holder 30 can be held by the guide wall 14b. With such a simple configuration, a stable ascending and descending operation can be achieved.

The present invention is not limited to the above-described embodiment as itis, and structural elements can be modified and embodied at the implementation stage without departing from the gist thereof.

In the above-described embodiment, for example, the two-staged configuration in which the transport lines 21A and 21B are vertically arranged as an outward path and a return path is exemplified, but the configuration is not limited thereto. For example, the outward line or the return line, or both, may have two lines or more, a plurality of transport lines 21A and 21B may be arranged horizontally, and transport lines may be arranged vertically at three stages or more.

In the above-described first embodiment, the configuration of setting a loop-shaped transport path and setting the ascent and descent to have the same distance, so that a take-in position and a take-out position have the same height, is described by way of example. However, the configuration is not limited thereto. The moving path can be set discretionarily. For example, the path may be set as a path to move from a predetermined take-in position to a distant take-out position. In addition, for example, by setting the path to have different ascending and descending distances, or by performing only either an ascending or a descending operation, the take-in position and the take-out position may have different heights.

In addition, in the above-described first embodiment, a configuration in which one conveyor device 20 is provided between the paired elevator devices 10 is described by way of example, but the configuration is not limited thereto. A plurality of conveyor devices 20 may be arranged consecutively to form one path. In addition, the holder transport apparatus may be configured to further comprise a processing device that performs various processing on the sample container 40 or a sample in the sample container 40 moving on the transport line 21A.

Furthermore, in the above-described first embodiment, an example in which the elevator device 10 and the conveyor device 20 are configured as separate devices is indicated, but the configuration is not limited thereto. For example, the elevator device 10 and the conveyor device 20 may be configured so that they are fixed to a common gantry.

For example, in the above-described first embodiment, an example in which the ascending and descending circulation path A1 and the transport path each have one row is indicated, but the configuration is not limited thereto. A plurality of ascending and descending circulation paths A1 and transport paths may be provided in parallel so as to convey in a plurality of rows.

In the above-described first embodiment, a mechanism of moving along the loop-shaped circulation path A1 courtesy of the ascending and descending chain 13 as an ascending and descending mechanism is used, but the configuration is not limited thereto. For example, an ascending and descending driving mechanism, such as a cylinder, may be used to cause the support plate 14 to reciprocate in a predetermined ascending and descending path.

In addition, in the above-described embodiment, an example in which one sample container 40 is mounted on one support plate 14 to be moved ascendingly and descendingly is indicated, but the configuration is not limited thereto. A plurality of sample containers may be mounted together on the support plate 14.

Figure 7:
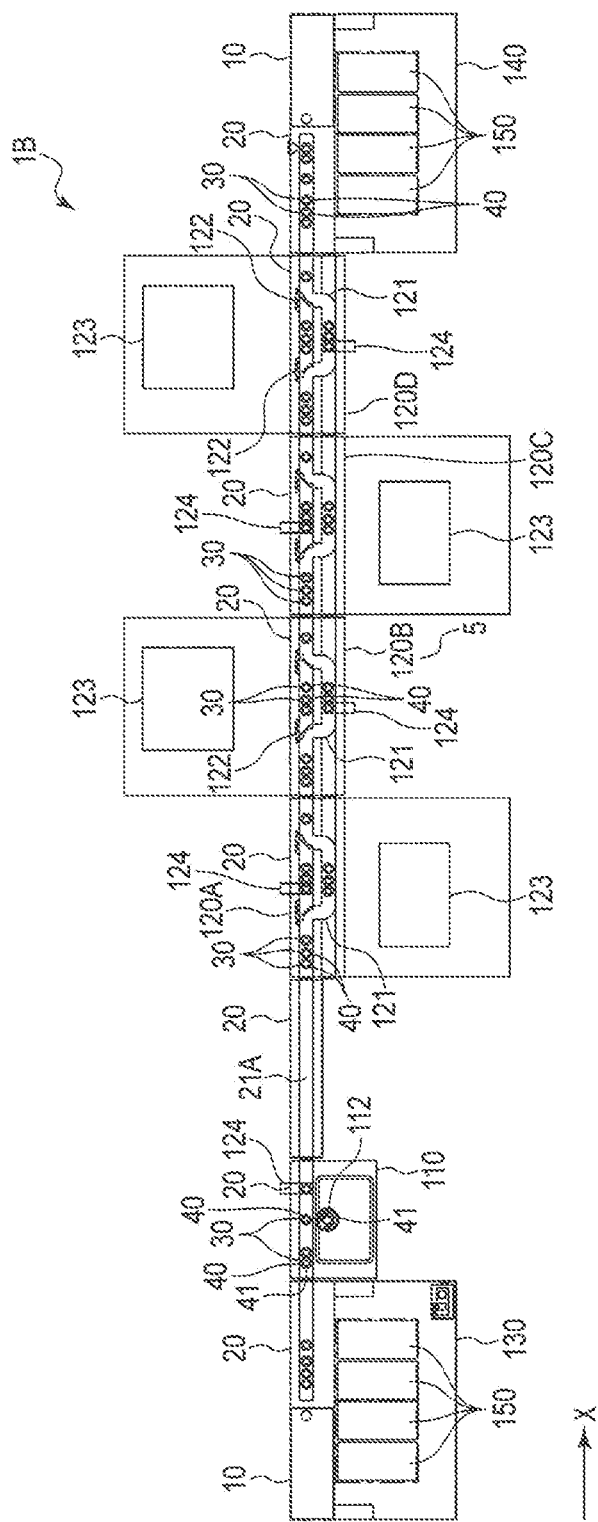
FIG. 7 is an explanatory diagram of the holder transport apparatus according to another embodiment of the present invention.
Figure 8:
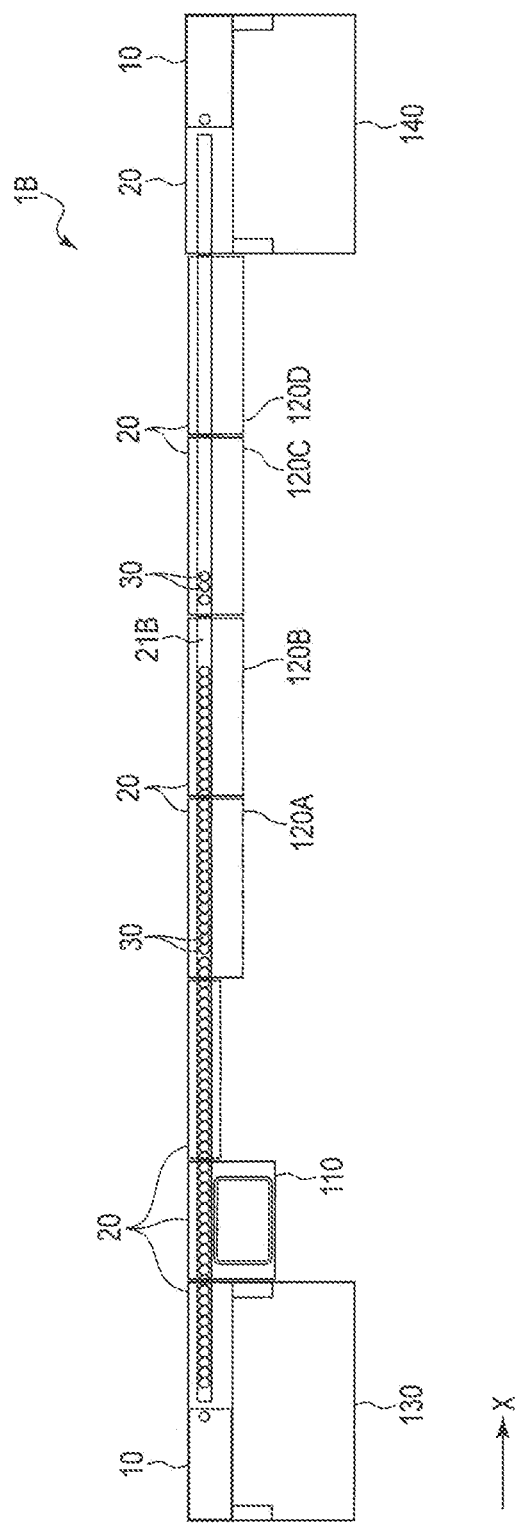
FIG. 8 is an explanatory diagram of the holder transport apparatus.

FIG. 7 is a plan view showing a configuration of the transport line 21A of the upper stage of a holder transport apparatus 1B according to another embodiment, and FIG. 8 is a plan view showing a configuration of the transport line 21B of the lower stage of the holder transport apparatus 1B. For example, the holder transport apparatus 1B shown in FIGS. 7 and 8 as another example comprises a plurality of processing devices comprising the conveyor device 20. In the holder transport apparatus 1B, the conveyor device 20, a cap-removal device 110 as a processing device including the conveyor device 20, and a plurality of analyzers 120A, 120B, 120C, and 120D are arranged in a line, between a pair of elevator devices 10 arranged at both ends. As an example, the cap-removal device 110 and the four analyzers 120A, 120B, 120C, and 120D are arranged alternately on one lateral side and the other lateral side of the transport line 21A of the upper stage.

The holder transport apparatus 1B further comprises a take-in device 130 that takes the sample containers 40 in the elevator device 10, and a take-out device 140 that takes the sample containers out of the elevator device.

Similarly to the holder transport apparatus 1 according to the first embodiment, each conveyor device 20 is configured with the vertically two-staged transport lines 21A and 21B.

The cap-removal device 110 comprises the conveyor device 20, and a cap-removal portion 111, including a cap-removal head as a processing head, which performs a cap-removal process on the sample containers or the samples flowing on the upper transport line 21A. By holding the cap 41 mounted on the sample container 40 and moving the cap 41 upward, for example, the cap-removal portion 111 removes the cap 41 from the sample container 40.

A plurality of analyzers 120A, 120B, 120C, and 120D are arranged in a line so that the transport lines 21A and 21B are consecutive. Each analyzer 120 comprises the conveyor device 20, a guide device 122, and an analysis-processing device 123.

The conveyor devices 20 of the analyzers 120A, 120B, 120C, and 120D each comprise the transport line 21A and a sub-line 121 provided in parallel with the transport line 21A. The analyzers 120A, 120B, 120C, and 120D may be the same devices, or for example, may be different types of analyzers with different inspection items.

The guide device 122 comprises a turning blade that guides the sample container on the transport line 21A to the sub-line 121.

The analysis-processing device 123 comprises a dispense nozzle 124 as a processing head that dispenses the sample in the sample container 40 disposed on the transport line 21A or the sub-line 121, and analyzes the sample dispensed by the dispense nozzle 124. For example, the analysis-processing devices 123 of the analyzers 120A and 120C are provided on one lateral side of the transport line 21A, and the analysis-processing devices 123 of the analyzers 120B and 120D are provided on the other lateral side of the transport line 21A. In addition, the dispense nozzles 124 of the analyzers 120A and 120C are arranged on the transport line 21A, and the dispense nozzles 124 of the analyzers 120B and 120D are arranged on the sub-line 121. Namely, in the adjacent analyzers 120A to 120D, dispense positions are arranged on different lines, and the analysis-processing devices 123 are arranged alternately.

The take-in device 130 includes a transferring head as a processing head, and transfers the sample containers 40 from a rack 150, holding the sample containers in plural, to the holders 30 that are on standby in the elevator device 10.

The transport lines 21A of a plurality of conveyor devices 20 respectively provided in the take-in device 130, the cap-removal device 110, a plurality of analyzers 120, and the take-out device 140, are arranged consecutively to each other to form a predetermined transport path. The transport lines 21B of a plurality of conveyor devices 20 respectively provided in the take-in device 130, the cap-removal device 110, a plurality of analyzers 120, and the take-out device 140, are arranged consecutively to each other to form a predetermined transport path.

The cap-removal device 110 is arranged on a downstream side in the transport line 21A of the take-in device 130. The cap-removal device 110 includes a cap-removal head as a processing head, and performs a cap-removal process of holding a side portion and the cap of the sample container taken in and flowing on the transport line 21A, and removing the cap from the sample container by moving the cap upward.

The analysis-processing device 123 is arranged on the downstream side in the transport line 21A of the cap-removal device 110. The analysis-processing device 123 includes the dispense nozzle 124 as a processing head which dispenses the sample in the sample container flowing on the transport line 21A in a state in which the cap is open, and performs analysis of predetermined items on the sample dispensed by the dispense nozzle 124.

The controller identifies the sample container 40 of the analysis target of each of the analyzers 120A to 120D based on information, such as a label of the sample container 40, etc. The controller controls the guide device 122 and the analysis-processing device 123. When the sample container 40 passes each of the analyzers 120A to 120D, the guide device 122 guides the sample containers 40 of inspection targets of the analyzers 120A to 120D to the lines directly below the dispense nozzles 124 of the analyzers 120A to 120D, and guides the non-target sample containers 40 to pass the other lines.

The analyzers 120A to 120D dispense, via the dispense nozzle 124, the sample from the sample container 40 arriving at the target line below the dispense nozzle 124, and perform analysis of the predetermined inspection items via the analysis-processing device 123.

The take-out device 140, for example, transfers the sample container 40 held in the holder 30 of the elevator device 10 to the rack 150.

The configuration according to the present embodiment produces effects similar to the above-described effects of the first embodiment.

In addition, in the present embodiment, the sub-line 121 can be arranged on either one lateral side or the other lateral side of the transport line 21A, and processing devices can be arranged on both lateral sides of the transport line 21A. Accordingly, arrangement of processing devices has higher flexibility than, for example, a configuration in which an outward path and a return path are arranged in parallel on the same plane. Therefore, the transport path can be easily shortened and miniaturized.

Figure 9:
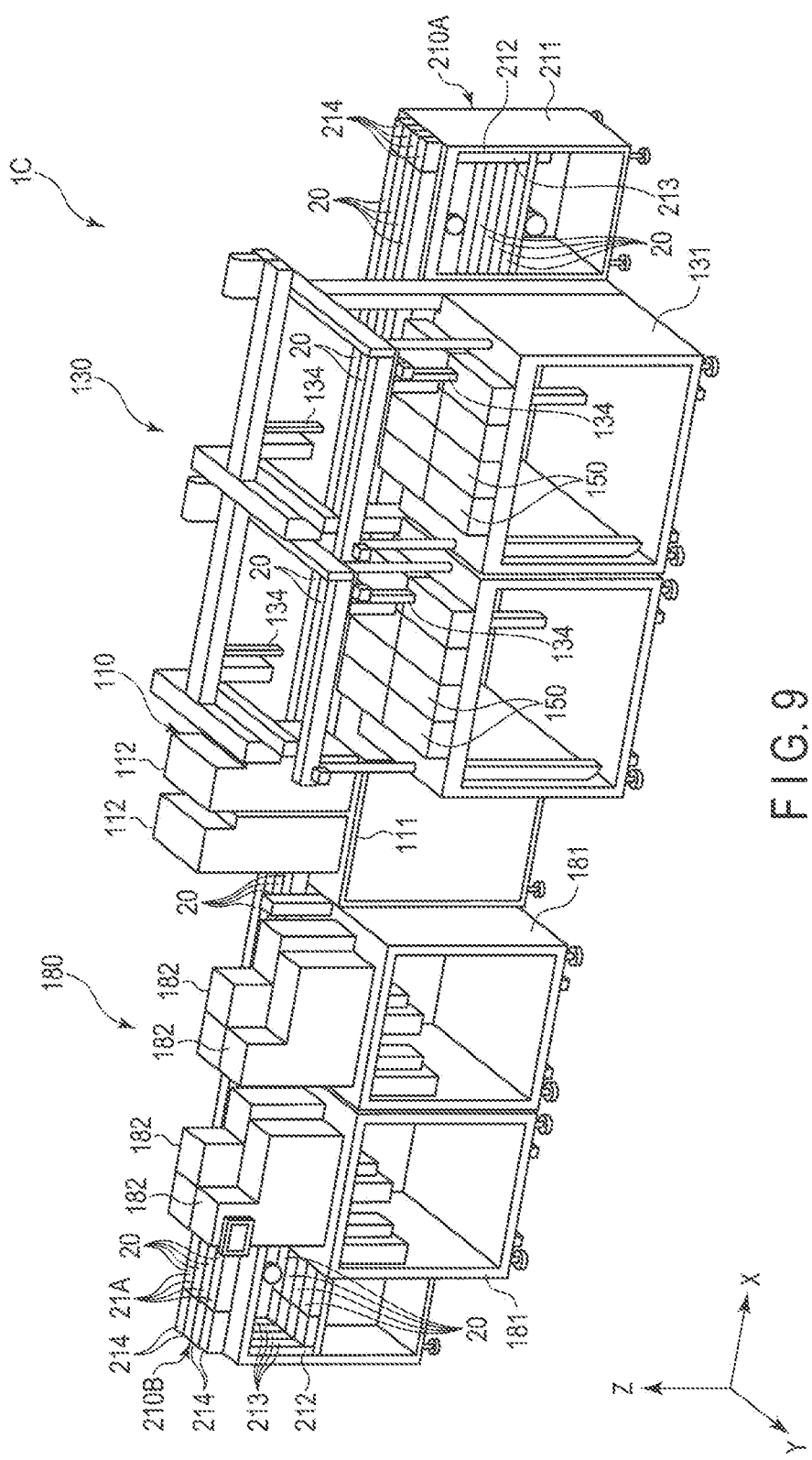
FIG. 9 is an explanatory diagram of a holder transport apparatus according to a third embodiment of the present invention.
Figure 10:
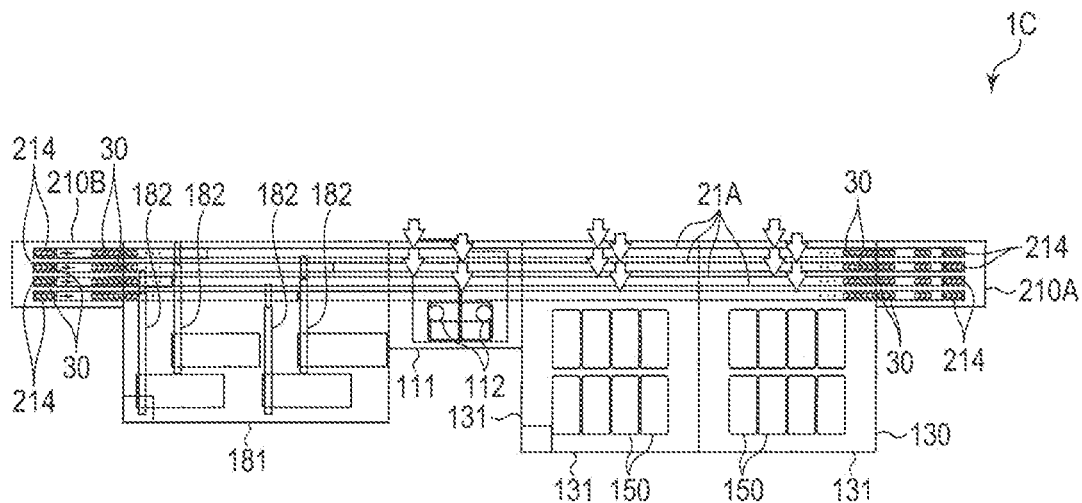
FIG. 10 is an explanatory diagram of the holder transport apparatus.
Figure 11:
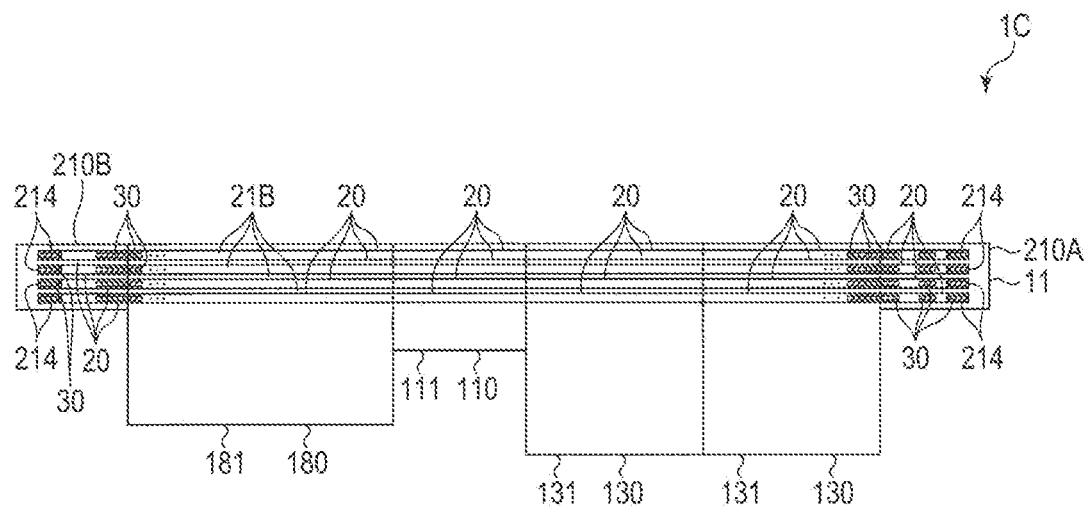
FIG. 11 is an explanatory diagram of the holder transport apparatus.
Figure 12:
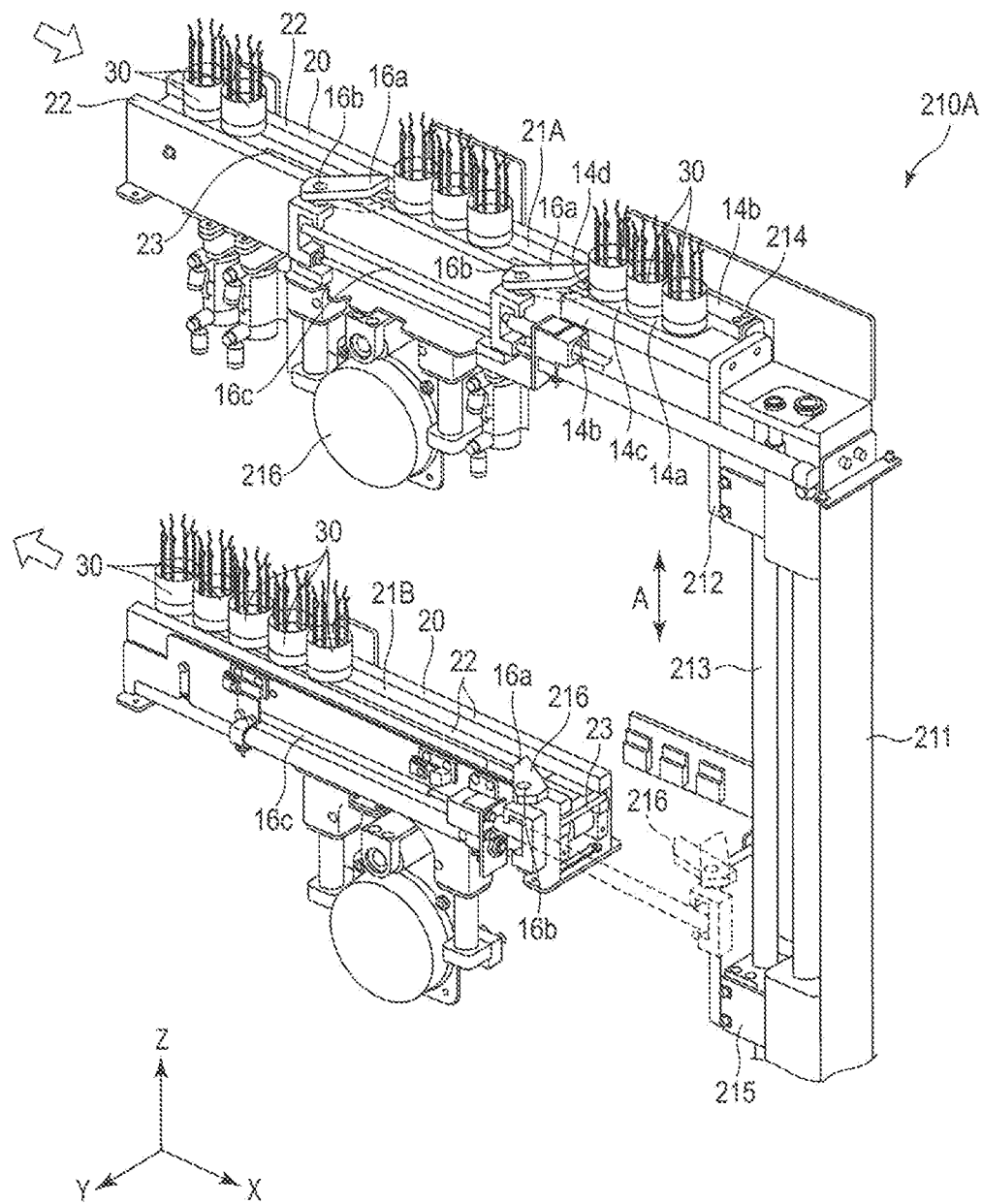
FIG. 12 is an explanatory diagram of the holder transport apparatus.
Figure 13:
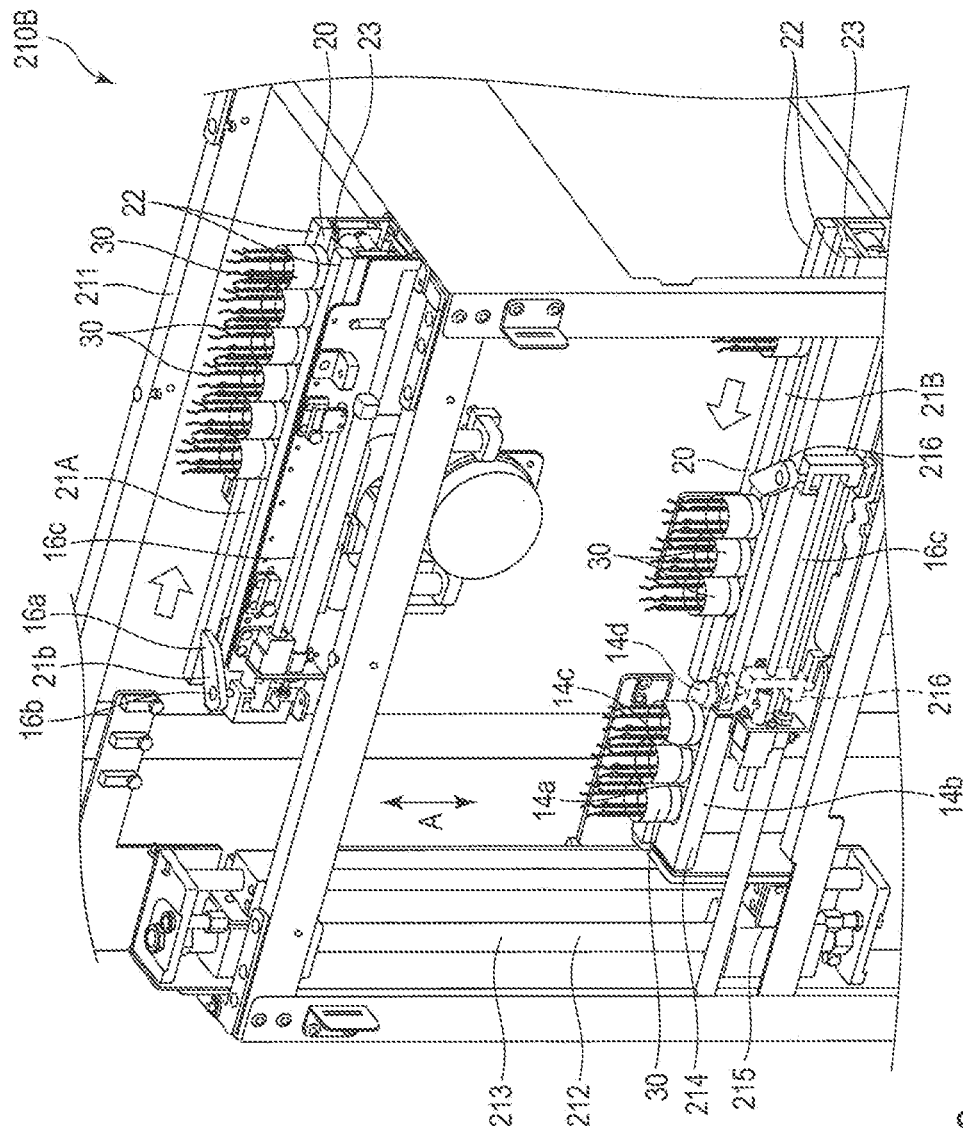
FIG. 13 is an explanatory diagram of the holder transport apparatus.

FIGS. 9 to 13 are explanatory diagrams of a holder transport apparatus 1C according to another embodiment. FIG. 9 is a perspective view of the holder transport apparatus 1C, FIG. 10 is a plan view showing the upper transport line 21A, and FIG. 11 is a plan view showing the lower transport line 21B. FIGS. 12 and 13 are perspective views showing a part of the configurations of elevator devices 210A and 210B provided on both ends of the transport path, respectively, showing only one ascending and descending path A, one transport line 21A, and one transport line 21B, among the four of each.

As shown in FIGS. 9 to 11, the holder transport apparatus 1C has a configuration in which the ascending and descending path A and the upper and lower transport lines 21A and 21B include four paths each, and a plurality of holders 30 are mounted on each support plate 214 (support member). Each of the elevator devices 210A and 210B includes the ascending and descending mechanisms 212 and the conveyor devices 20, mounted on a common gantry. The ascending and descending mechanism 212 is configured to cause the support plate 214 to reciprocate along an ascending and descending axis 213 extending in the vertical direction. Since the other configurations and operations are the same as those of the holder transport apparatuses 1 and 1B according to the above-described embodiments, detailed explanations will be omitted.

The holder transport apparatus 1C comprises a pair of elevator devices 210A and 210B, including the conveyor devices 20 integrally. Between the paired elevator devices 210A and 210B, a bulk loader 180 as a processing device, the cap-removal device 110, and the take-in device 130 are arranged in a line so that the transport paths are consecutive.

As shown in FIGS. 12 and 13, the elevator devices 210A and 210B each include the gantry 211, and a plurality of ascending and descending mechanisms 212, a plurality of conveyor devices 20, and a plurality of moving devices 216, provided in the gantry 211. In the present embodiment, the elevator device 210A on one side is a descending device that causes the holder 30 to descend. The elevator device 210B on the other side is an ascending device that causes the holder 30 to ascend.

Each ascending and descending mechanism 212 comprises the ascending and descending axis 213 provided along the predetermined ascending and descending path A, the support plate 214 supported in the ascending and descending axis 213, and an ascending and descending driving device 215.

Each of the support plates 214 is fixed to the ascending and descending axis 213 by a bracket. Similarly to the support plate 14, the support plate 214 comprises a plate member 14a including a mounting surface 14c orthogonal to the ascending and descending path, a guide wall 14b provided to stand on an outer circumference of a surface that is a main surface of one side of the plate member 14a, and a holding portion 14d that protrudes inward from the guide wall 14b. In the present embodiment, each of the support plates 214 holds a plurality of holders 30. The guide wall 14b opens toward an end portion of the adjacent conveyor device 20, receives the moving holder 30 by turning of the holder arm 16a of the moving device 216, and holds the holder 30 by the holding portion 14d.

Through the holder 30 being mounted on a mounting surface 14c that is a main surface of one side of the plate member 14a, the support plate 214 supports the holder 30 in an erect state, by the guide wall 14b and the holding portion 14d. The plurality of support plates 214 are attached in a direction in which the mounting surface 14c on the front side faces upward in the transport path on the conveyor device 20 side. On the support plate 214 of the present embodiment, three holders 30 are mounted and supported in a parallel direction along the transport paths 21A and 21B.

The moving device 216 comprises the holder arm 16a and an arm-driving device 16b that causes a moving arm to operate at a predetermined timing. The arm-driving device 16b comprises a turning shaft supporting the holder arm 16a turnably, and a moving shaft 16 supporting the turning shaft to be movable in a predetermined direction. The moving device 216 moves the holder 30 between the support plate 214 and the transport lines 21A and 21B.

The holder arm 16a is turnably connected to the turning shaft 16b that is movable in the transport direction, and is capable of turning and moving in the transport direction at a predetermined timing. The holder arm 16a can be, through turning for example, switched between a state where it is retracted from the transport path and a state where a distal end portion enters into the transport path. Also, through the turning shaft 16b moving in the transport direction along the moving shaft 16c, the holder arm 16a moves along the transport path. The holder arm 16a is retracted to a position deviated from a path of the holder 30 in a standby state, and enters into the transport path at a predetermined timing. It also moves in the transport direction in such a state as to press the holder 30, present in the transport path, toward the transport direction. For example, in the elevator device 210A on one side shown in FIG. 12, the moving device 216 arranged in an end portion of the transport path 21A presses the holder 30 flowing through the upper-stage transport path 21A to move onto the support plate 214 arranged opposite thereto. After the support plate 214 has descended, the holder 30 is moved from the support plate 214 onto the transport path 21B arranged opposite thereto, by the moving device 216 arranged at the lower stage. In the elevator device 210B on the other side shown in FIG. 13, for example, the moving device 216 arranged in an end portion of the lower transport path 21B moves the holder 30, flowing through the lower-stage transport path 21B, onto the support plate 214 arranged opposite thereto. After the support plate 214 is ascended, the holder 30 is moved from the support plate 214 onto the transport path 21A arranged opposite thereto, by the moving device 216 arranged at the upper stage.

As shown in FIGS. 9 to 11, the paired elevator devices 210A and 210B and the processing devices 180, 110, and 130 are arranged such that the transport lines 21A and 21B of the conveyor device 20 are arranged consecutively, and a gap of the transport lines 21A and 21B between adjacent processing devices is smaller than the holder 30.

The processing devices 210A, 210B, 180, 110, and 130, including the elevator devices 210A and 210B, each have four conveyor devices 20 at each of the upper and lower stages. At each of the upper and lower stages, four pairs of guide rails and four conveyor belts are provided.

Each of the processing devices is arranged on the conveyor device 20 and at a processing position immediately above the upper transport line 21A of the conveyor device 20, or includes a processing head configured to be movable in an area including the aforementioned processing position.

The bulk loader 180 comprises a gantry 181, a plurality of conveyor devices 20 provided in the gantry 181, and sorting heads 182 as processing heads which sort the sample containers 40 in the erect state on the transport path 21A.

The cap-removal device 110 comprises a gantry 111, a plurality of conveyor devices 20 provided in the gantry 111, and a plurality of cap-removal heads 112 as processing heads which are provided in the gantry ill and are arranged on the upper transport line 21A.

The take-in device 130 includes a gantry 131, a plurality of conveyor devices 20 provided in the gantry 131, and a transfer head 134 as a processing head which is provided in the gantry 131 and is movable in a movement area including the upper transport line 21A.

The other configurations are the same as those of the holder transport apparatuses 1 and 1A according to the above-described embodiments.

In the present embodiment also, the same advantageous effect as that of the holder transport apparatuses 1 and 1A according to the above-described embodiments is achieved. Furthermore, by arranging ascending and descending paths and transport paths in a plurality of rows, it is possible to perform a large amount of sample processing at a high speed.

In the present embodiment, through a configuration in which a plurality of processing units comprising the common conveyor devices 20 are arranged in a line, the processing devices can be increased and decreased, and the device layout can be changed according to the content of processing and the installation space condition.

Figure 14:
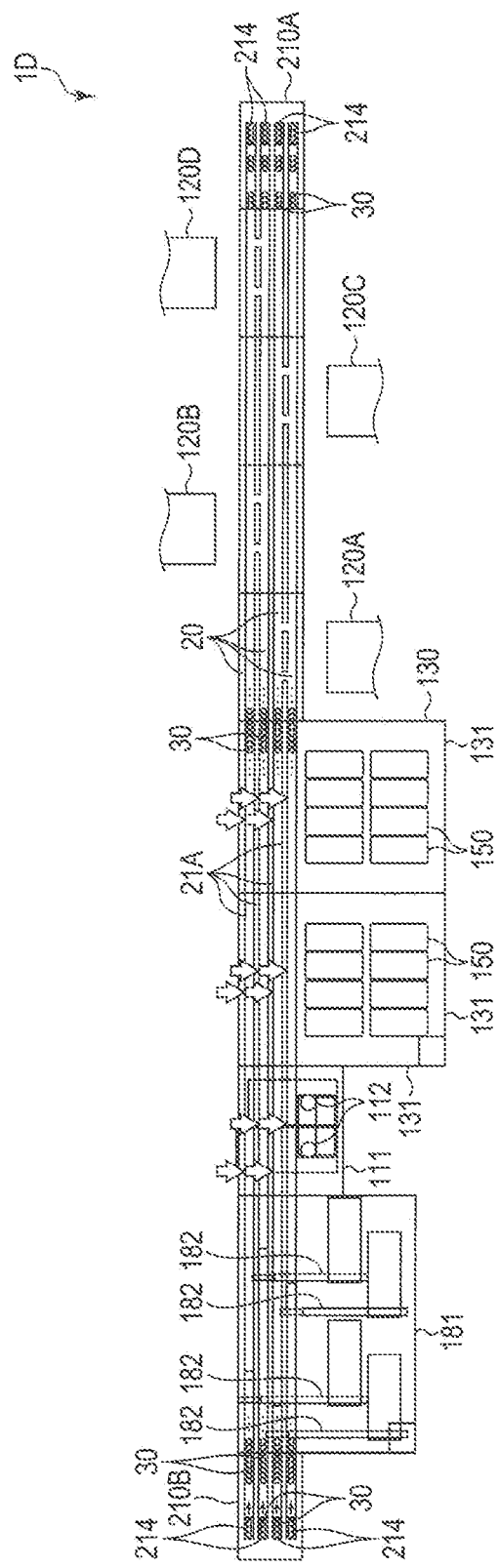
FIG. 14 is an explanatory diagram of a holder transport apparatus according to another embodiment.
Figure 15:
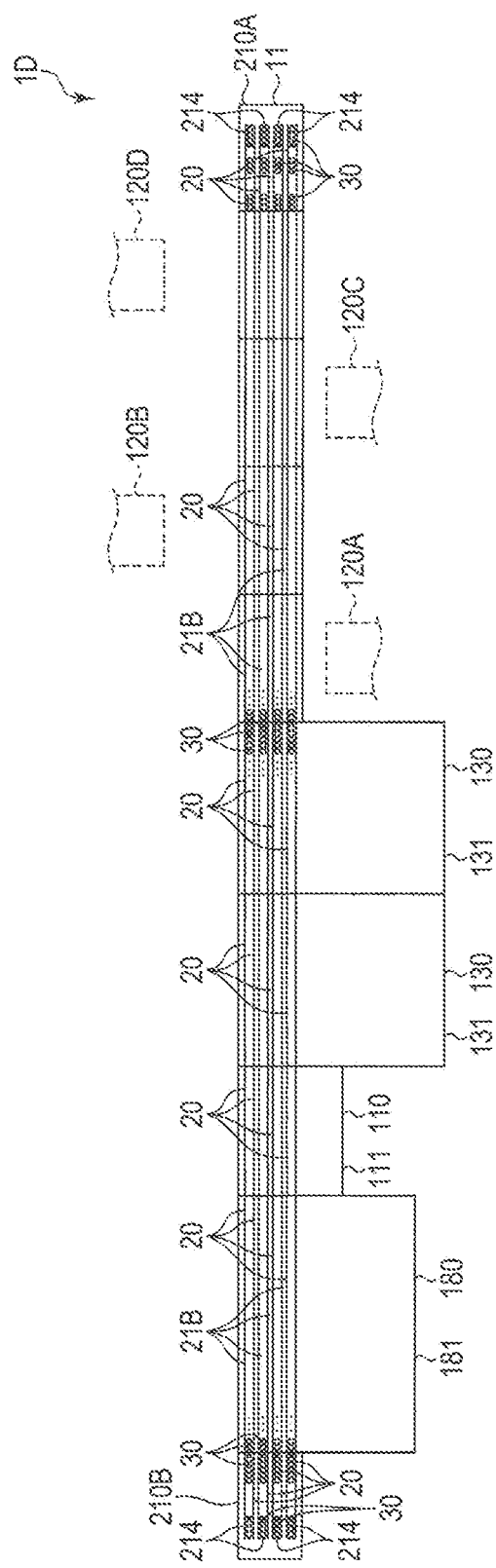
FIG. 15 is an explanatory diagram of the holder transport apparatus according to the aforementioned another embodiment.

As another embodiment, for example, a holder transport apparatus 1D shown in FIGS. 14 and 15 has a configuration in which a plurality of analyzers 120A to 120D are added to the holder transport apparatus 1C. FIG. 14 is a plan view showing the upper transport line 21A, and FIG. 15 is a plan view showing the lower transport line 21B. The analyzers 120A, 120B, 120C, and 120D include the analysis-processing device 123, and the dispense nozzle 124 as a processing head which is movable in a movement area including the upper transport line 21A. In the present embodiment also, the same advantageous effect as that of each of the above-described embodiments is achieved.

In each of the above-described embodiments, the vertically two-staged transport mechanism is described by way of example, but the configuration is not limited thereto. For example, stop positions may be set at three portions or more, and a transport mechanism of three stages or more, may be provided.

In each of the above-described embodiments, an example in which the conveyor devices 20 of a plurality of processing devices are constituted individually and arranged in a line so that the transport lines 21A and 21B of the adjacent processing devices are consecutive is indicated, but the configuration is not limited thereto. For example, a transport device over a plurality of processing units may be connected integrally, and a processing device including a processing head extending onto a transport path may be arranged on a lateral side of said transport device.

Other than the above, each structural element exemplified in the above-described embodiments may be deleted, and shape, structure, material, etc. of each structural element may be changed. Various inventions can be formed by appropriately combining a plurality of structural elements disclosed in the above-described embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A holder transport apparatus comprising:
   an elevator device including a support portion that supports, in an erect state, a holder holding a sample container and moves along a predetermined ascending and descending path; and
   a plurality of transport mechanisms that are arranged in a plurality of portions in a direction of the ascending and descending path, and convey the holder along a transport line, which is arranged adjacent to the support portion present in the ascending and descending path of the elevator device and intersects with the ascending and descending path,
   wherein the transport mechanism comprises a guide rail arranged on a lateral side of the holder along the transport line, and a conveyance member that supports a bottom portion of the holder and moves the holder in a transport direction,
   wherein the support portion comprises a support plate that supports the bottom portion of the holder, and a guide member arranged on the lateral side of the holder, and
   wherein a space between the support plate of the support portion arranged at a predetermined stop position and an end portion of a transport path of the transport mechanism is narrower than a length of the holder in a direction of the transport path.

2. The holder transport apparatus according to claim 1, wherein
   an end portion of the transport line and an ascending path or the ascending and descending path of the elevator device are arranged adjacent to each other, and
   the holder transport apparatus further comprises a moving device which moves the holder between the support plate and the transport line.

3. The holder transport apparatus according to claim 1, further comprising a processing device which performs processing on the sample container flowing on the transport line.

4. The holder transport apparatus according to claim 1, comprising the ascending and descending paths, and the transport lines each in a plurality of rows in a direction which intersects with an extending direction of the ascending and descending path and an extending direction of the transport line.

5. The holder transport apparatus according to claim 1, wherein a plurality of holders are mounted on the support portion and arranged in a transport direction.

6. The holder transport apparatus according to claim 1, wherein the guiderail of the support portion opens toward an end portion of an adjacent transport mechanism.

7. A holder transport apparatus comprising:
an elevator device including a support portion that supports, in an erect state, a holder holding a sample container and moves along a predetermined ascending and descending path; and
a plurality of transport mechanisms that are arranged in a plurality of portions in a direction of the ascending and descending path, and convey the holder along a transport line, which is arranged adjacent to the support portion present in the ascending and descending path of the elevator device and intersects with the ascending and descending path,
wherein the transport mechanism comprises a guide rail arranged on a lateral side of the holder along the transport line, and a conveyance member that supports a bottom portion of the holder and moves the holder in a transport direction,
wherein the support portion supports the bottom portion of the holder, and comprises a guide member arranged on the lateral side of the holder, and
wherein a space between the support portion arranged at a predetermined stop position and an end portion of a transport path of the transport mechanism is narrower than a length of the holder in a direction of the transport path.

8. The holder transport apparatus according to claim 7, wherein
an end portion of the transport line and an ascending path or the ascending and descending path of the elevator device are arranged adjacent to each other, and
the holder transport apparatus further comprises a moving device which moves the holder between the support portion and the transport line.

9. The holder transport apparatus according to claim 7, further comprising a processing device which performs processing on the sample container flowing on the transport line.

10. The holder transport apparatus according to claim 7, comprising the ascending and descending paths, and the transport lines each in a plurality of rows in a direction which intersects with an extending direction of the ascending and descending path and an extending direction of the transport line.

11. The holder transport apparatus according to claim 7, wherein a plurality of holders are mounted on the support portion and arranged in a transport direction.

12. The holder transport apparatus according to claim 7, wherein a guiderail of the support portion opens toward an end portion of an adjacent transport mechanism.

* * * * *